(12) United States Patent
Smithson et al.

(10) Patent No.: US 10,788,065 B2
(45) Date of Patent: Sep. 29, 2020

(54) SIDEWALL PANEL ASSEMBLY

(71) Applicant: C&D ZODIAC, INC., Huntington Beach, CA (US)

(72) Inventors: Tyler Smithson, Huntington Beach, CA (US); Jordan Thomas Payne, Provo, UT (US); Tyson Dean Merrell, Springville, UT (US); Stephen Michael Hills, Provo, UT (US); Christopher Brooks, Thornton, CO (US); Matthew Bangerter, Provo, UT (US); Michael D. Ridges, Highland, UT (US)

(73) Assignee: C&D ZODIAC, INC., Huntington Beach, CA (US)

( * ) Notice: Subject to any disclaimer, the term of this patent is extended or adjusted under 35 U.S.C. 154(b) by 62 days.

(21) Appl. No.: 15/940,657

(22) Filed: Mar. 29, 2018

(65) Prior Publication Data

US 2018/0283421 A1    Oct. 4, 2018

Related U.S. Application Data

(60) Provisional application No. 62/479,128, filed on Mar. 30, 2017.

(51) Int. Cl.
*F16B 5/00* (2006.01)
*B64C 1/06* (2006.01)
(Continued)

(52) U.S. Cl.
CPC ............ *F16B 5/0088* (2013.01); *B64C 1/066* (2013.01); *B64C 1/12* (2013.01); *F16B 5/07* (2013.01);
(Continued)

(58) Field of Classification Search
CPC ... B64C 1/066; B64C 1/12; F16B 5/07; F16B 5/126; F16B 19/1081; F16B 5/0088;
(Continued)

(56) References Cited

U.S. PATENT DOCUMENTS

| 4,000,870 A | 1/1977 | Davies |
| 5,855,347 A * | 1/1999 | Hollingsworth ..... A47B 96/061 211/59.1 |

(Continued)

OTHER PUBLICATIONS

International Search Report and Written Opinion issued in PCT/US18/25256.

*Primary Examiner* — Maria V Ewald
*Assistant Examiner* — Ethan Weydemeyer
(74) *Attorney, Agent, or Firm* — Jeffer Mangels Butler & Mitchell LLP; Brennan C. Swain, Esq.

(57) ABSTRACT

A panel assembly that is configured to be secured to a frame that includes a panel having a top and a bottom, a first bracket assembly and a second bracket assembly. The first bracket assembly includes a first pivot member and a first bracket. One of the first bracket and first pivot member is secured to the panel and the other is configured to be secured to the frame. The first bracket includes a slot defined therein that includes a throat and a pivot opening. The throat is defined between first and second throat surfaces and the throat is narrower than the pivot opening. The second bracket assembly includes a second pivot member and a second bracket. One of the second bracket and second pivot member is secured to the panel and the other is configured to be secured to the frame. The second bracket includes a pivot opening.

13 Claims, 11 Drawing Sheets

(51) Int. Cl.
*F16B 5/12* (2006.01)
*B64C 1/12* (2006.01)
*F16B 5/07* (2006.01)
*F16B 21/02* (2006.01)
*F16B 21/09* (2006.01)
*F16B 19/10* (2006.01)

(52) U.S. Cl.
CPC .............. *F16B 5/126* (2013.01); *F16B 21/02* (2013.01); *F16B 21/09* (2013.01); *F16B 5/123* (2013.01); *F16B 19/1081* (2013.01)

(58) Field of Classification Search
CPC .......... F16B 21/02; F16B 21/09; F16B 5/123; Y10T 403/59–599
USPC .............. 428/192–194; 403/19–22, 321–330
See application file for complete search history.

(56) References Cited

U.S. PATENT DOCUMENTS

| | | | |
|---|---|---|---|
| 6,401,398 B1* | 6/2002 | Panayides | B64C 1/14 49/498.1 |
| 2003/0177797 A1* | 9/2003 | Storvick | B64D 29/06 70/276 |
| 2005/0284995 A1* | 12/2005 | Hutter, III | B64C 1/406 248/235 |
| 2007/0252041 A1 | 11/2007 | Ebner | |
| 2008/0067289 A1 | 3/2008 | Meyer | |
| 2009/0114766 A1* | 5/2009 | Sjunnesson | F01D 25/28 244/54 |
| 2009/0277994 A1 | 11/2009 | Lobato | |
| 2013/0320140 A1 | 12/2013 | Cheung | |
| 2014/0117157 A1 | 5/2014 | Diep | |

\* cited by examiner

SIDEWALL PANEL ASSEMBLY

CROSS REFERENCE TO RELATED APPLICATIONS

This application claims the benefit of U.S. Provisional Application No. 62/479,128, filed Mar. 30, 2017, which is incorporated by reference herein in its entirety.

FIELD OF THE INVENTION

The present invention relates generally to a sidewall panel assembly for use in aircraft.

BACKGROUND OF THE INVENTION

Most aircraft sidewall panel seams have issues that leave them poorly aligned. The panels also can be difficult to install and uninstall and allow noise and cold air to pass directly to passengers seated in the cabin.

SUMMARY OF THE PREFERRED EMBODIMENTS

In accordance with a first aspect of the present invention there is provided a panel assembly that is configured to be secured to a frame. The panel assembly includes a panel having a top and a bottom, a first bracket assembly and a second bracket assembly. The first bracket assembly includes a first pivot member and a first bracket. One of the first bracket and first pivot member is secured to the panel and the other of the first bracket and first pivot member is configured to be secured to the frame. The first bracket includes a slot defined therein that includes a throat and a pivot opening. The throat is defined between first and second throat surfaces and the throat is narrower than the pivot opening. The second bracket assembly includes a second pivot member and a second bracket. One of the second bracket and second pivot member is secured to the panel and the other of the second bracket and second pivot member is configured to be secured to the frame. The second bracket includes a pivot opening defined therein. In a preferred embodiment, the first pivot member defines a major axis and a minor axis. The first pivot member can fit through the throat when the major axis is approximately parallel to at least one of the first and second throat surfaces, and the first pivot member cannot fit through the throat when the major axis is not approximately parallel to at least one of the first and second throat surfaces.

In a preferred embodiment, the first bracket assembly includes a pivot portion and the slot is defined in the pivot portion. The pivot portion includes a front surface, a back surface and first and second side surfaces. At least one of the first and second throat surfaces defines a non-right angle with at least one of the front surface and the first side surface. Preferably, the first bracket assembly is positioned adjacent the top of the panel and the second bracket assembly is positioned adjacent the bottom of the panel assembly, and the pivot opening in the second bracket is a closed pivot opening. Preferably, the first bracket member includes a flange portion and the pivot portion that meet at an angle and the flange portion is secured to a back surface of the panel.

In a preferred embodiment, the panel includes a main body portion and an overlapping portion. A thickness of the overlapping portion is less than a thickness of the main body portion. Preferably, the overlapping portion is positioned on a first side of the panel and extends from the top to the bottom. In a preferred embodiment, the panel includes a seal member thereon that is positioned on a second side of the panel and on a back surface of the panel. Preferably, the panel includes the first side, a second side, a front surface and a back surface. The first side includes a first radius of curvature and the second side includes a second radius of curvature. The second radius of curvature is greater than the first radius of curvature.

In a preferred embodiment, the panel assembly includes a first latch assembly that includes a first latch member and a first latch bracket. One of the first latch bracket and first latch member is secured to the panel and the other of the first latch bracket and first latch member is configured to be secured to the frame. Preferably, the first latch member includes a catch that is configured to engage a ledge on the first latch bracket. Preferably, the first latch member is made of a material such that a magnet can unlatch the first latch member from the first latch bracket.

In accordance with another aspect of the present invention there is provided a method of installing a panel system on a frame. The method includes obtaining a first panel assembly that includes a panel having a top and a bottom, a first bracket assembly and a second bracket assembly. The first bracket assembly includes a first pivot member and a first bracket. One of the first bracket and first pivot member is secured to the panel and the other of the first bracket and first pivot member is secured to the frame. The first bracket includes a slot defined therein that includes a throat and a pivot opening. The throat is defined between first and second throat surfaces, and the throat is narrower than the pivot opening. The second bracket assembly includes a second pivot member and a second bracket. One of the second bracket and second pivot member is secured to the panel and the other of the second bracket and second pivot member is secured to the frame. The second bracket includes a pivot opening defined therein. The method includes inserting the second pivot member into the pivot opening in the second bracket, inserting the first pivot member through the throat and into the pivot opening in the first bracket, and pivoting the panel from a starting position to an installed position.

In a preferred embodiment, the first pivot member defines a major axis and a minor axis. When the first pivot member is inserted through the slot, the first pivot member is oriented such that the major axis is approximately parallel to at least one of the first and second throat surfaces. Preferably, the panel includes a main body portion and an overlapping portion and the thickness of the overlapping portion is less than the thickness of the main body portion. When the panel is pivoted to the installed position the overlapping portion contacts the back surface of an adjacent panel.

The present invention provides an easy to install panel and seam with reliable thermal and acoustic properties. Generally, the invention closes like a door with automatically form fitting overlap surfaces allowing for large displacement without loss of thermal and acoustic function. A magnetic release mechanism provides simple install and uninstall capability. Quiet, warm, visually appealing and consistent seams allow panels to be quickly and easily installed and have relatively low maintenance issues. In a preferred embodiment, when installed in an aircraft, the panel system is set up so that the seams are not at a position where a passenger is likely to put their fingers or a pencil or other slender item into the seam.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
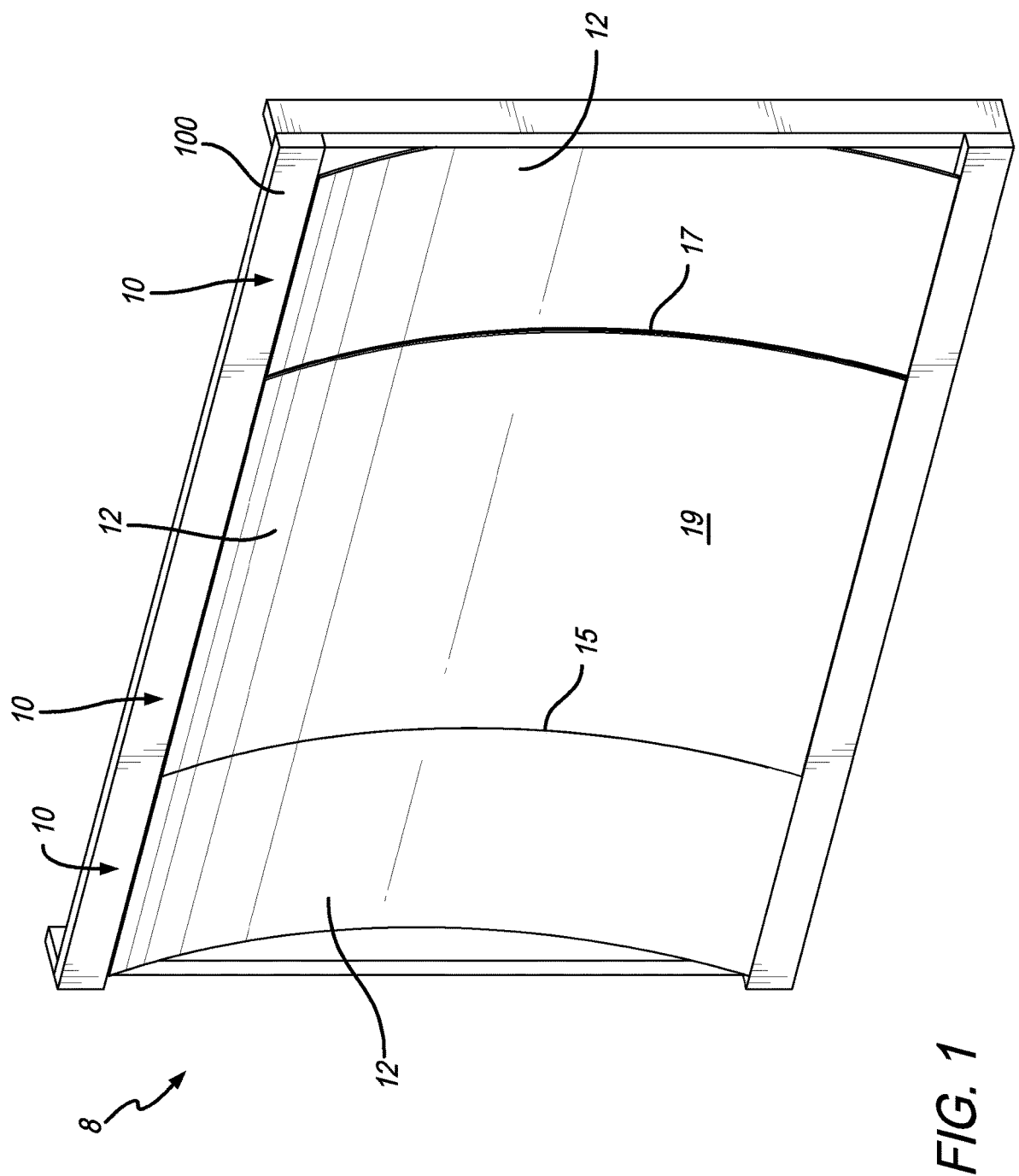
FIG. 1 is a front perspective view of three panel assemblies secured to the frame of an aircraft in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Referring now to the drawings, which are for purposes of illustrating the present invention and not for purposes of limiting the same, the attached drawings show a panel assembly and system for use in commercial aircraft. However, the panel system can be used in other locations.

As shown in FIGS. 1-9, in a preferred embodiment, each panel assembly 10 includes a panel 12 having an overlapping portion 14. A series of panel assemblies 10 are referred to herein as a panel system 8. The panel 12 is secured to the frame 100 of the aircraft by a first bracket assembly 16 that includes a first pivot pin member 20 that is secured to the frame 100 and a first bracket 22 that is secured to the panel 12 and a second bracket assembly 18 that includes a second pivot pin member 21 that is secured to the frame 100 and a second bracket 23 that is secured to the panel 12. The panels 12 each include a first side 15, second side 17, front surface 19, back surface 31, top 27 and bottom 29. It will be appreciated that the front surface 19 is the concave side that faces the passengers and the cabin interior.

Figure 6A:
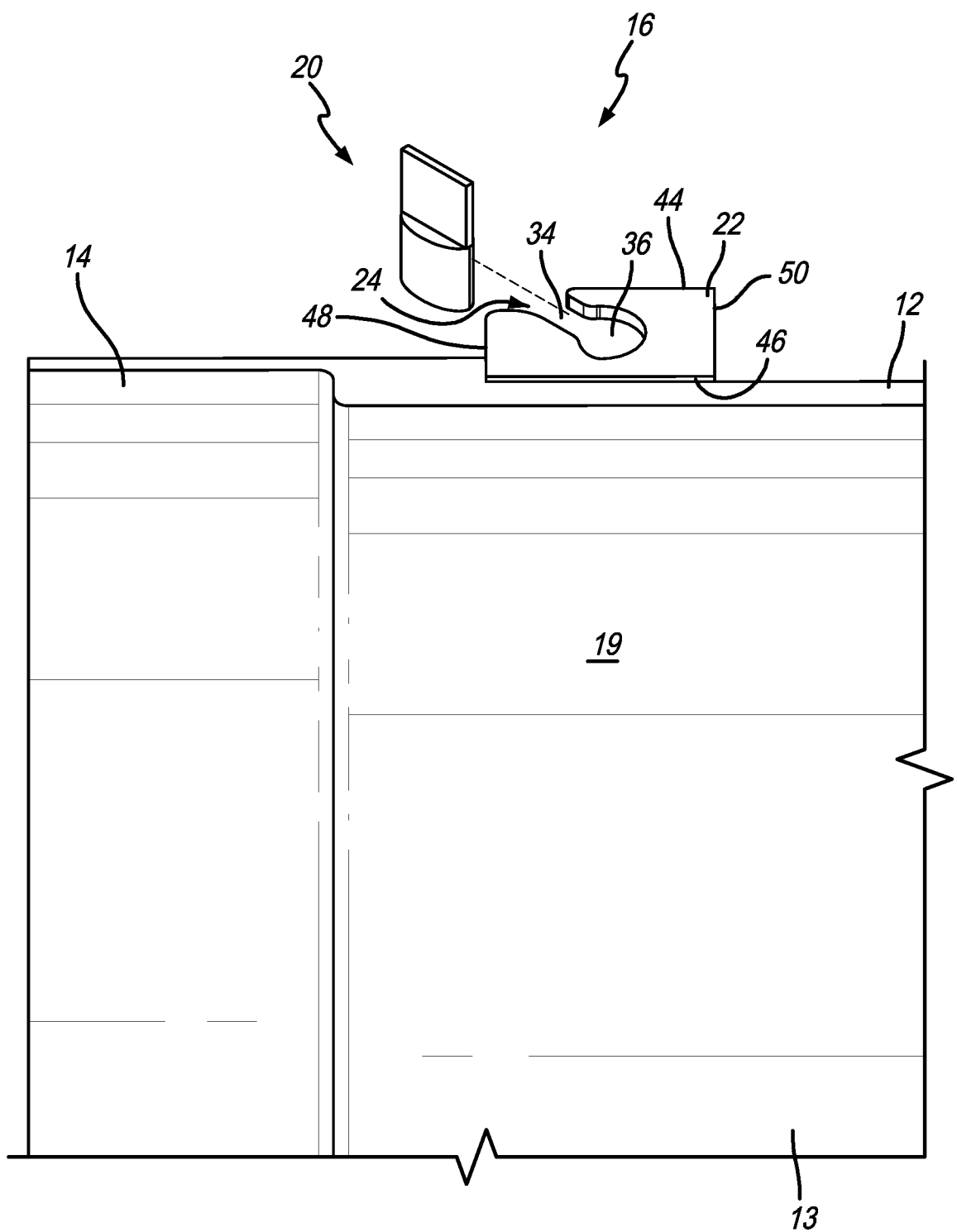
FIGS. 6A-6C are a series of perspective views of a pin being inserted into a bracket.
Figure 6B:
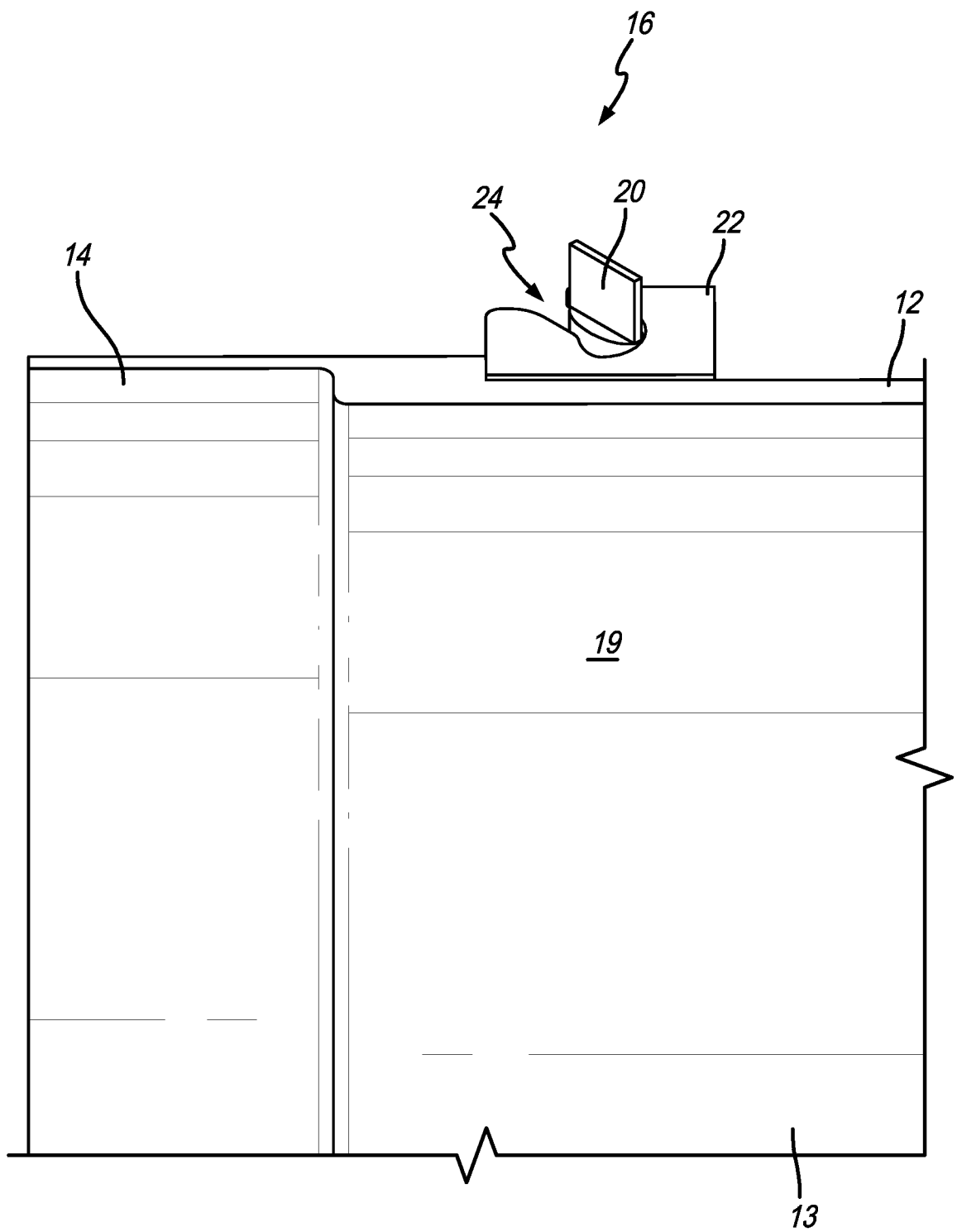
Figure 6C:
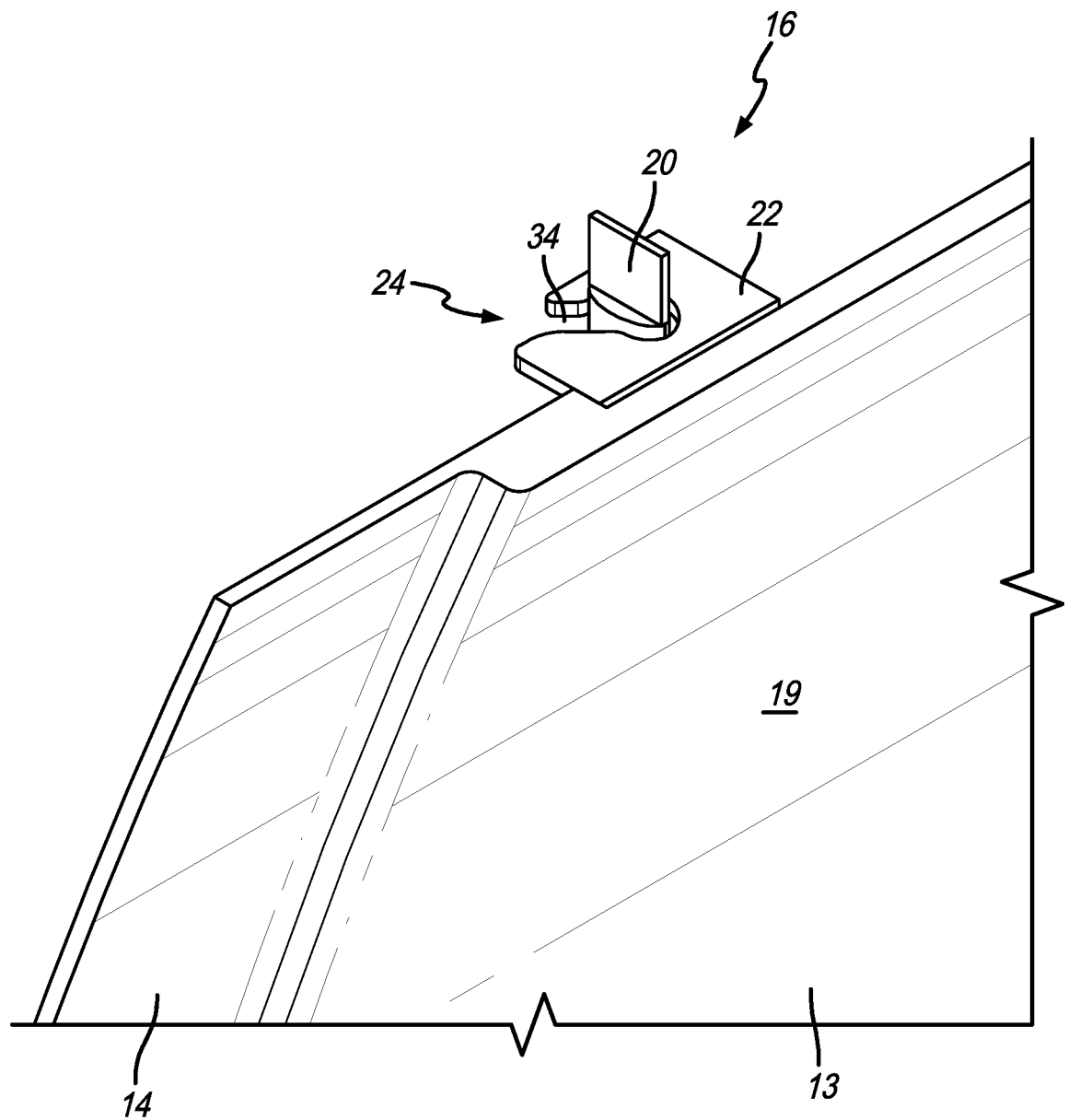

Each panel 12 is configured to pivot on first and second pins or pivot pin members 20 and 21 in a similar manner to a door. As shown in FIGS. 6A-8, the first and second pivot pin members 20 and 21 and corresponding first and second brackets 22 and 23 act like a hinge to allow the panel 12 to move or pivot between a starting position and an installed position. As shown in FIGS. 6A-6C, in a preferred embodiment, the first pivot pin member 20 is positioned adjacent the top 27 of the panel 12, includes an ovular or elliptical shape and is mounted to the frame. The first bracket 22 is preferably mounted to the back of the panel at the top thereof. As shown in FIG. 8, in a preferred embodiment, the second pivot pin member 21 is positioned adjacent the bottom of the panel 12, includes a circular shape and is mounted to the frame. The second bracket 23 is mounted to the back of the panel at the bottom thereof.

Figure 7:
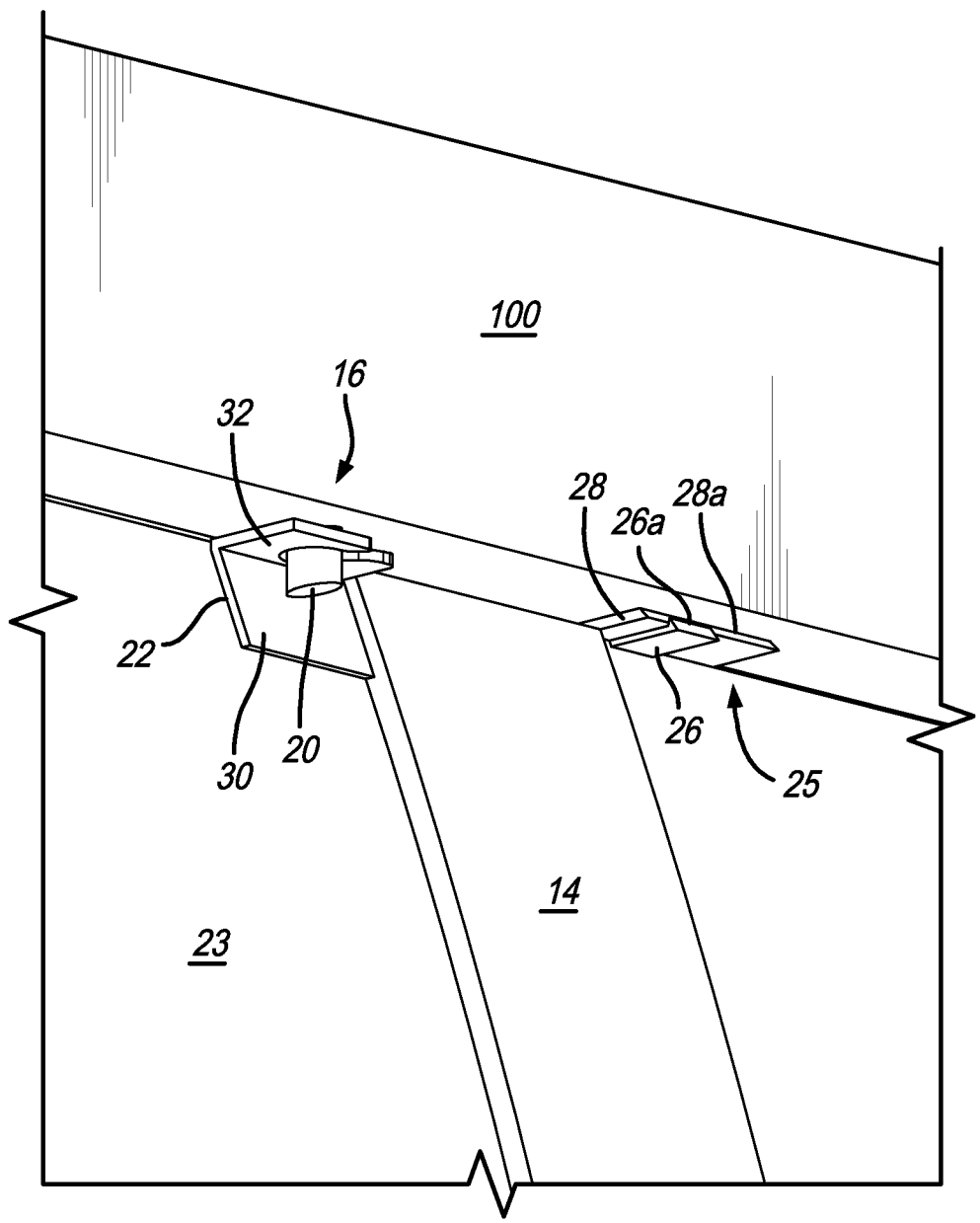
FIG. 7 is a perspective view of a top pin inserted into a bracket called out from FIG. 2.
Figure 8:
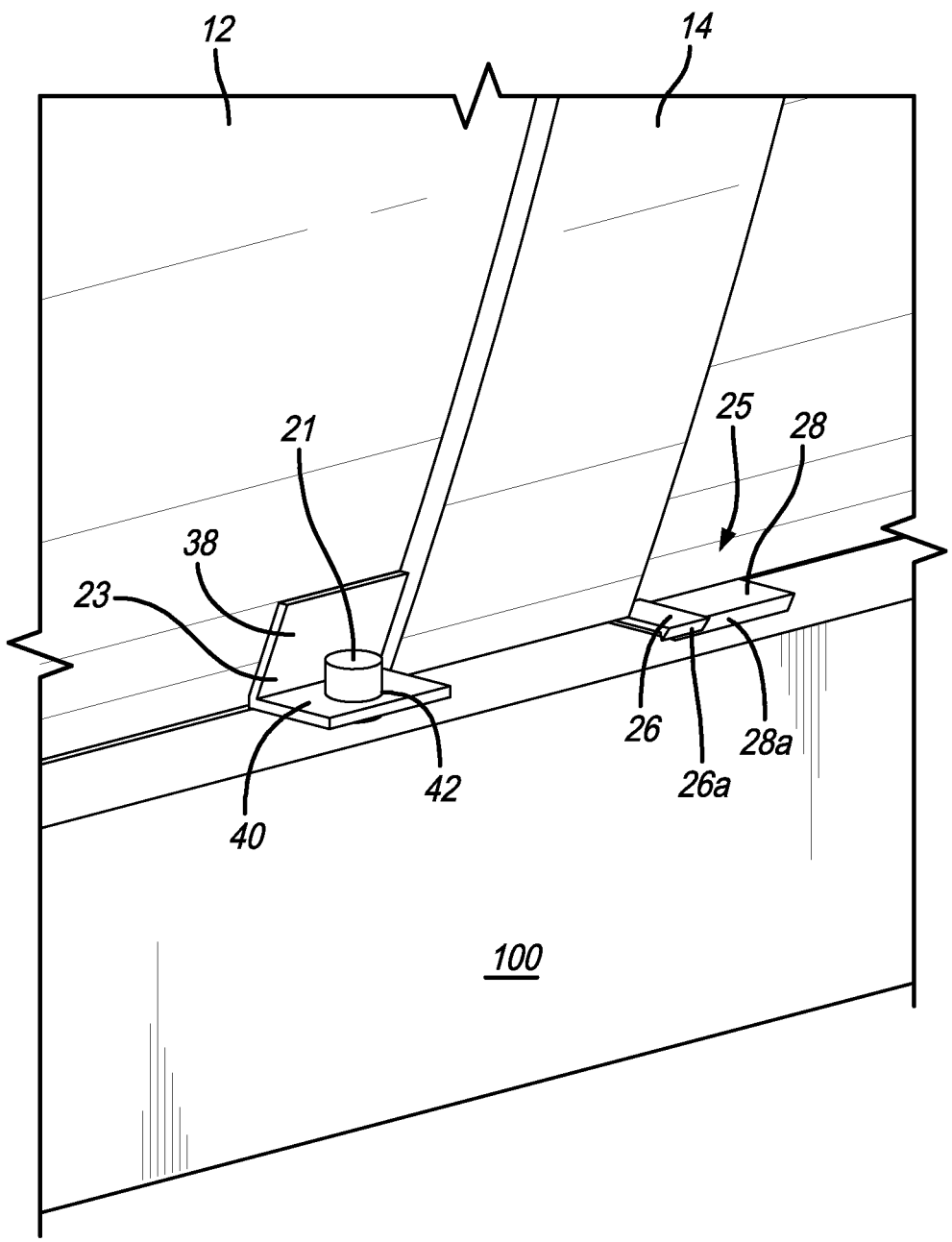
FIG. 8 is a perspective view of a bottom pin inserted into a bracket called out from FIG. 3.

As shown in FIGS. 6A-7, the first brackets 22 include a flange portion 30 and a pivot portion 32. The pivot portion 32 includes a slot 24 defined therein. The slot 24 includes a throat 34 and a pivot opening 36. The first pivot pin member 20 has a geometry that includes a major axis A1 along its length and a minor axis A2 along its width (see FIG. 9). The throat is defined by first and second throat surfaces 34a and 34b. The dimension of width of the throat 34 is such that the first pivot pin member 20 can only fit through the throat 34 when the minor axis A2 or width is properly oriented, as shown in FIG. 6B. The major axis A1 or length is wide enough that the first pivot pin 20 cannot fit through the throat 34. The throat 34 is also preferably oriented so that the first pivot pin 20 can only be received or accepted at a non-right angle θ (see FIG. 9). In a preferred embodiment, θ is 45°. However, θ can be any angle between 1° and 89°. Once installed, the dimension of the major axis of the first pivot pin member 20 prevents the pin from being able to be pulled back through the throat. Put another way, the first pivot member 20 can fit through the throat 34 when the major axis A1 is approximately parallel to at least one of the first and second throat surfaces 34*a* and 34*b*, and the first pivot member 20 cannot fit through the throat 34 (or back out of the throat 34) when the major axis A1 is not approximately parallel to at least one of the first and second throat surfaces 34*a* and 34*b*. It will be appreciated that the first and second throat surfaces may be oriented such that they are non-parallel and may be at a non-right angle where they slope inwardly such that the throat is wider at the beginning (for ease of insertion). As long as there is a portion of the throat 34 that is narrow enough to only allow insertion of the first pivot member 20 when oriented properly, it is within the scope of the invention. In an embodiment, the first bracket 22 can simply be the frame 100 and the slot, throat and pivot opening can be defined in the frame.

Figure 9:
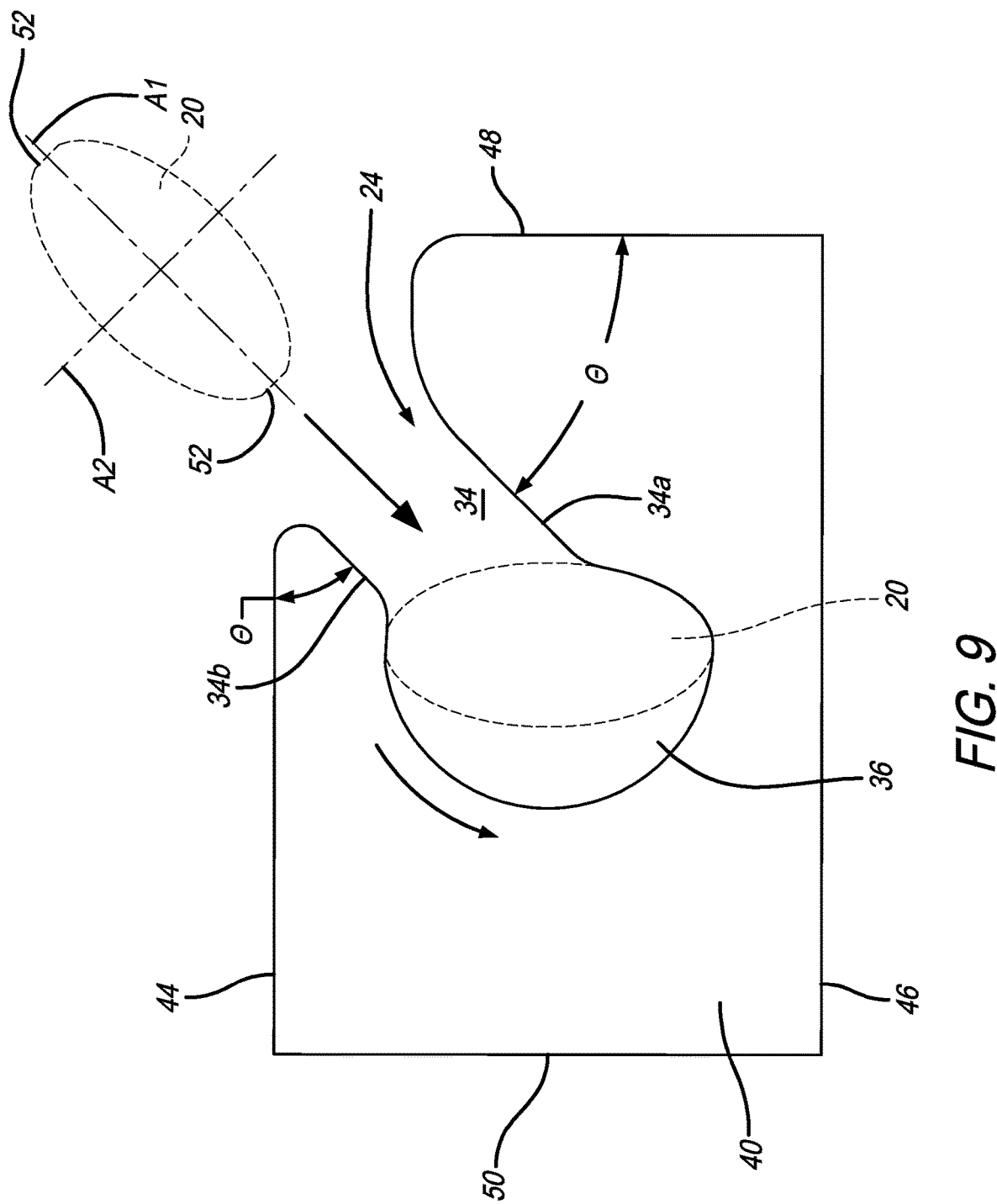
FIG. 9 is bottom plan view of a first bracket and showing two different positions of a first pivot pin member in hidden lines.

As shown in FIG. 9, the pivot portion 32 of the first bracket 22 includes a front surface 44, a back surface 46 and first and second side surfaces 48 and 50. As shown in FIG. 9, both of the first and second throat surfaces defines the angle θ with one of the front surface 44 or the first side surface 48. In a preferred embodiment, the first pivot member 20 includes opposing flat surfaces 52 that help seat the first pivot member 20 in the installed position.

Figure 2:
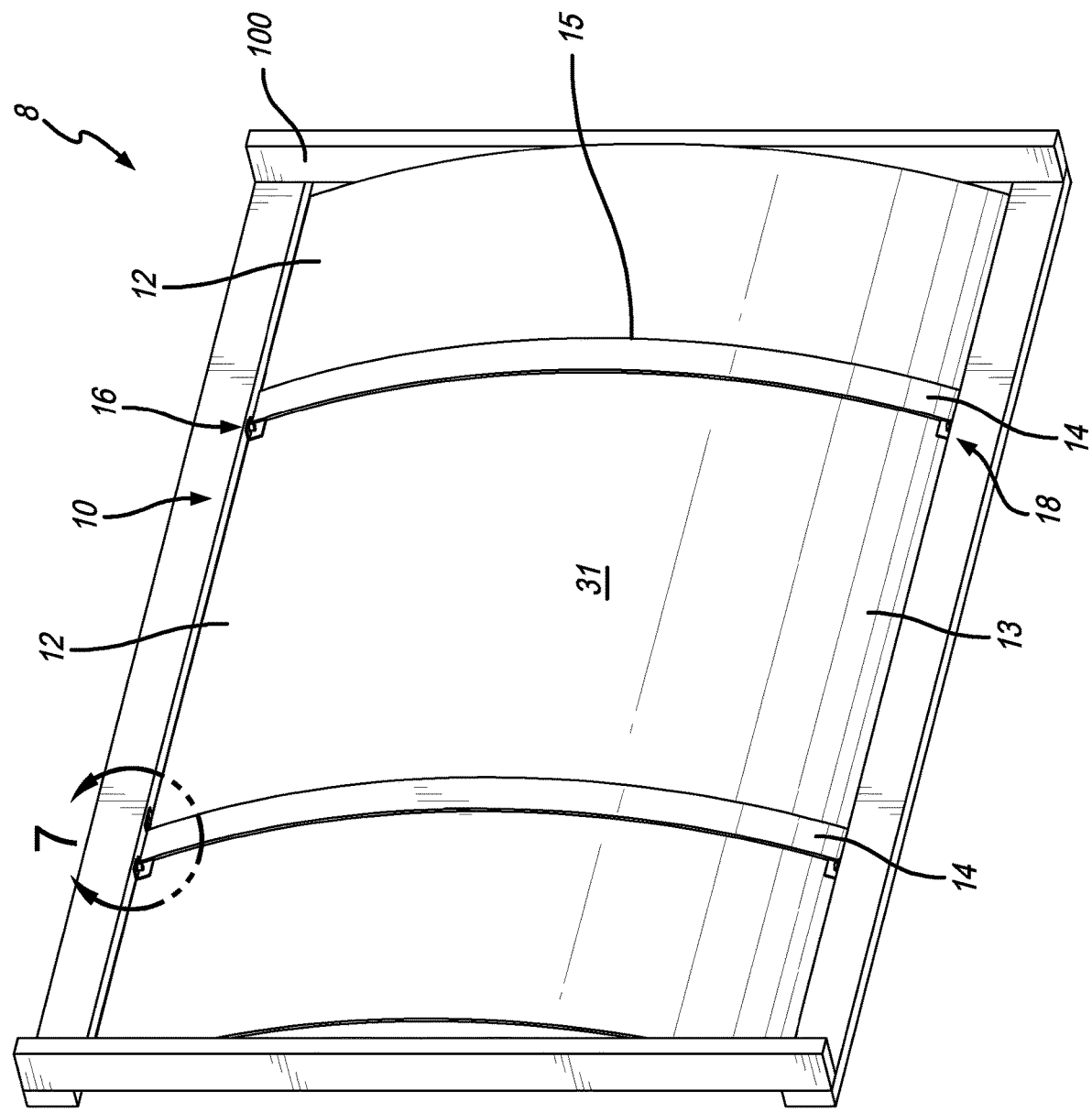
FIG. 2 is a rear perspective of the three panel assemblies of FIG. 1.
Figure 3:
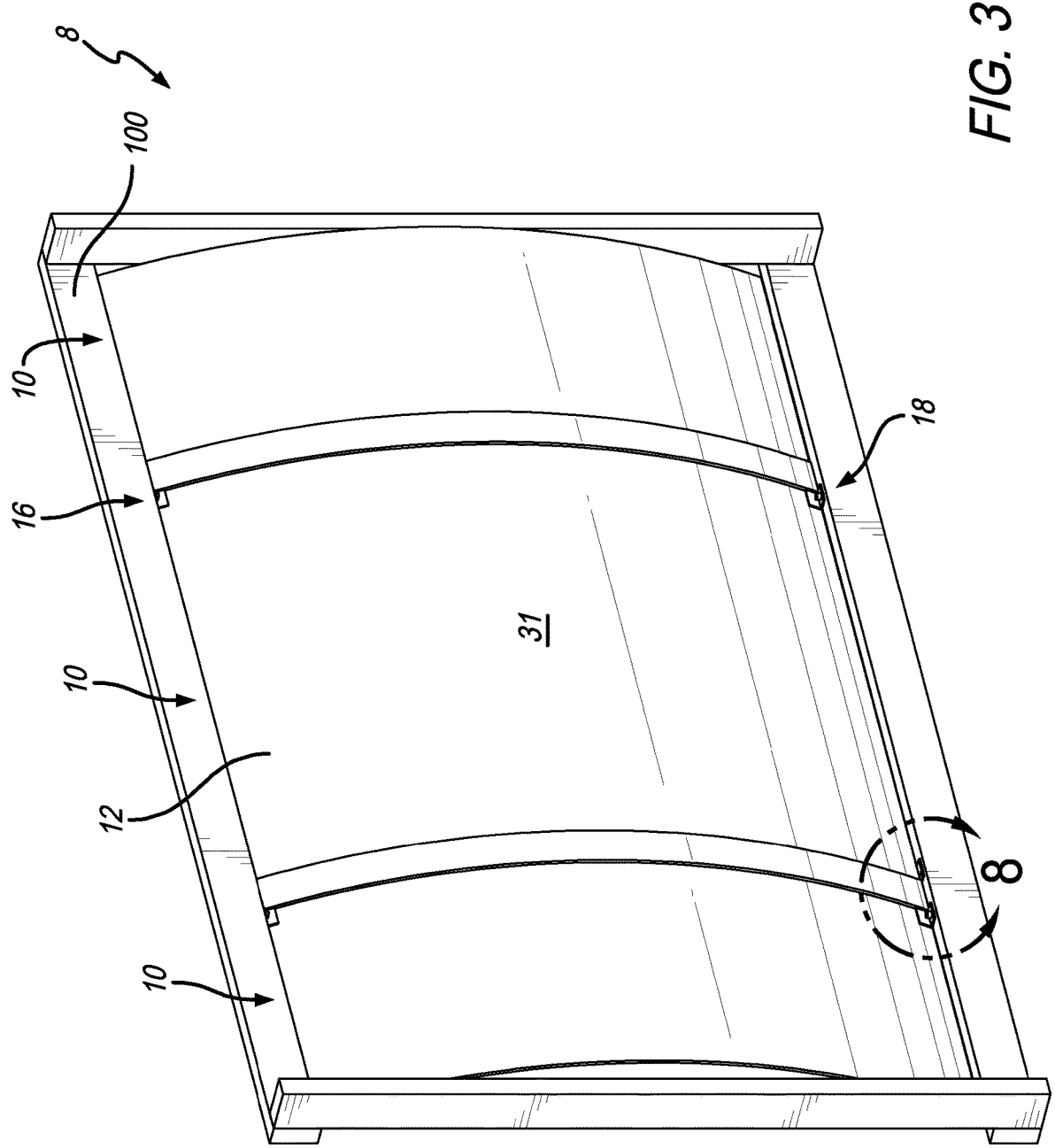
FIG. 3 is another rear perspective of the three panel assemblies of FIG. 1.
Figure 4:
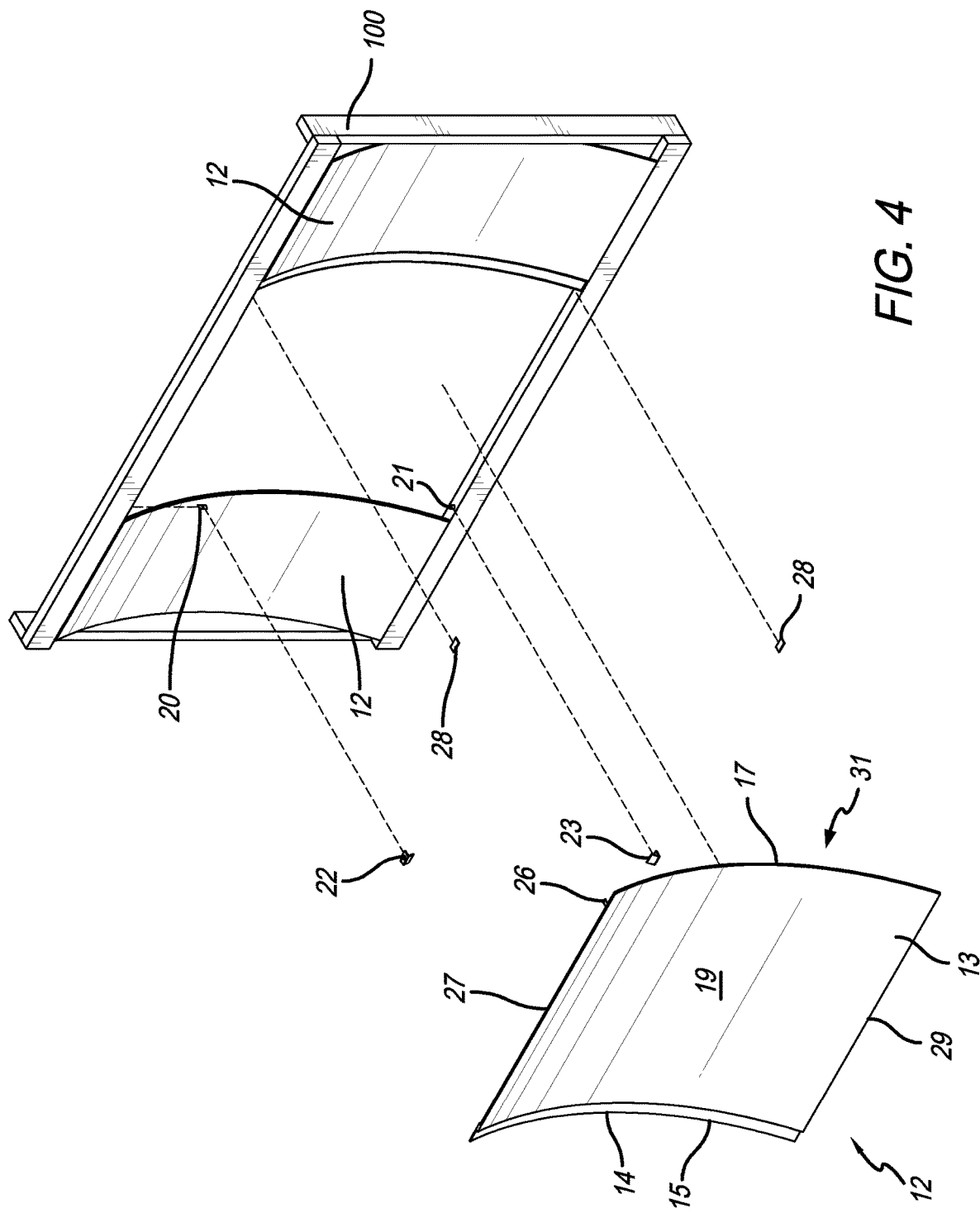
FIG. 4 is an exploded perspective view of one of the three panel assemblies of FIG. 1.
Figure 5:
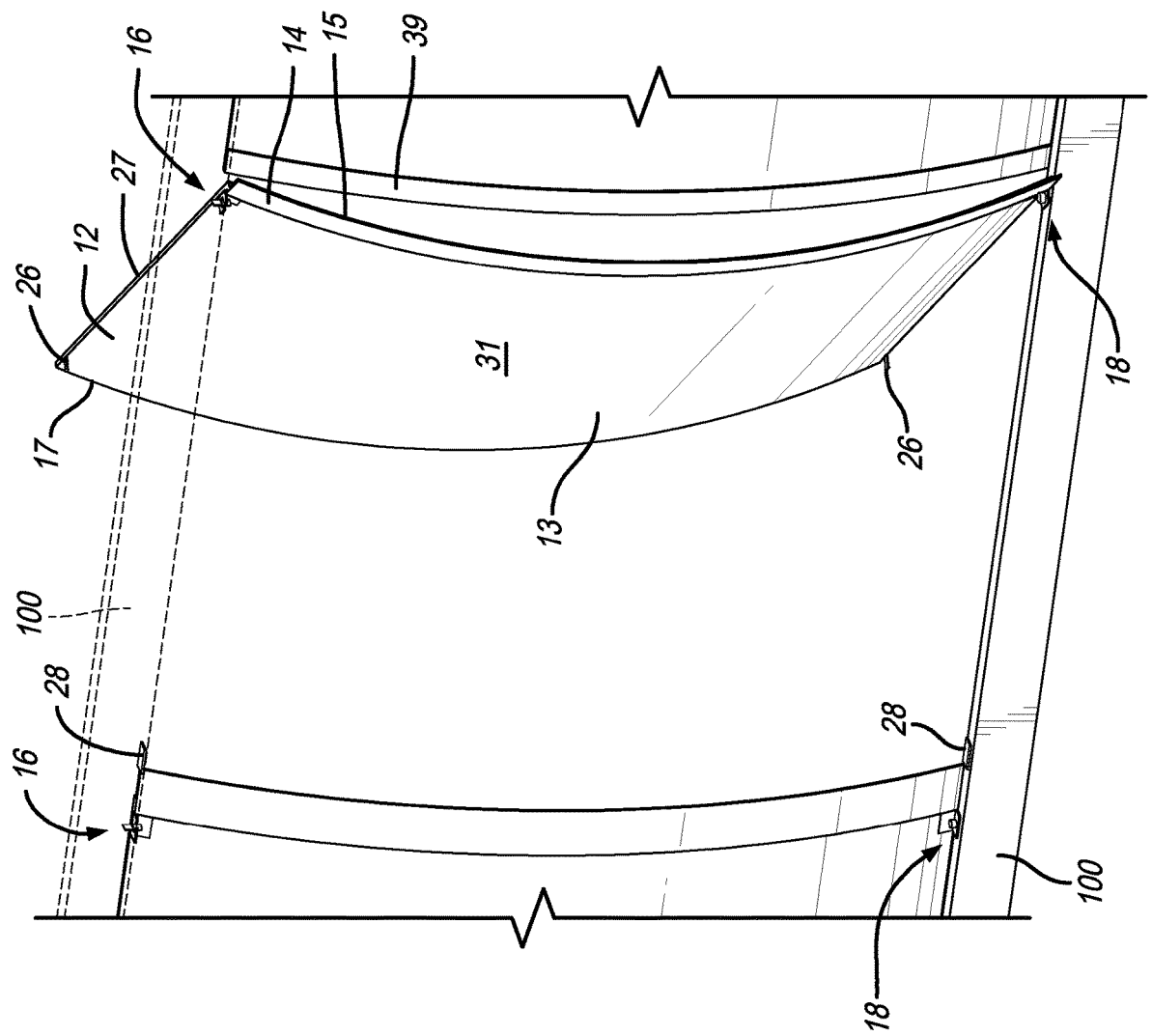
FIG. 5 is a rear perspective of the three panel assemblies of FIG. 1 with the center panel in the starting position.

The second bracket 23 includes a flange portion 38 and a pivot portion 40. The pivot portion 40 includes a closed pivot opening 42 defined therein. In an embodiment, the second bracket 23 can simply be the frame 100 and the closed pivot opening is just an opening in the frame. The second pivot pin member 21 is sized so that it can be received in the pivot opening 42. As is shown in FIG. 5, in use, the panel 12 is oriented at an angle and the pivot portion 40 of the second bracket 23 is positioned such that the second pivot pin member 21 is received in the pivot opening 42. The first pivot pin member 20 is then moved through the throat 34 of slot 24 (see FIG. 6B) and into the pivot opening 36. The panel 12 is then pivoted or hinged from the starting position (see FIG. 5) to the installed position (as shown in FIGS. 1-3) and the latch assemblies (described below) are latched. In the installed position, the first pivot pin member 21 cannot fit back through the throat 34.

In another embodiment a single pin and bracket or more than two pins and brackets can be used. In another embodiment, the pins can be attached to the panels and the brackets to the frame. In another embodiment, first bracket assemblies 16 (that include slot 24) can be used on the top and bottom of the panel.

As shown in FIGS. 4, 5, 7 and 8, in a preferred embodiment, each panel assembly 10 includes latch assemblies 25 that include a latch member 26 on the back of the panel 12 (on the top and bottom corners opposite the brackets) and a latch receiver or bracket 28 that are mounted to the frame 100. The latch member 26 includes a catch 26*a* that catches or latches on a ledge 28*a* on the latch member bracket 28 that is mounted to the frame 100. The latch member 26 is made of a material that is flexible and spring biases the latch 26 toward the latch bracket 28. Therefore, as the latch member 26 is installed, the catch 26*a* is pushed upwardly by the latch bracket 28, and when the catch 26*a* clears the latch bracket, it is spring biased downwardly and into engagement with the ledge 28*a*.

In a preferred embodiment the latch member 26 is magnetic. However, any type of latch is within the scope of the present invention. In this embodiment, the only way to release the latch assemblies 25 is by placing a strong magnet near the latch member 26. The magnet allows the latch to open. In another embodiment, the latch member 26 can be placed on the frame and the latch brackets 28 can be placed on the panel. In a preferred embodiment, the latch bracket 28 is wider than the latch member 26. This provides tolerance or give so that the latch member 26 can move laterally or transversely along the latch bracket 28. This is helpful, for example, when an airplane lands and parts move. For example, in FIG. 7 the latch member 26 is positioned toward the left end of the latch bracket 28. It can move to the left or the right and still remained latched.

As shown in FIGS. 2-6C, in a preferred embodiment, each panel 12 includes a main body portion 13 and a step portion or overlapping portion 14, much like a purlin. Preferably, each panel 12 includes a gasket or seal member 39 or other stripping on the back thereof (see FIG. 5) that interacts with and presses against the front surface of the overlapping portion 14 on an adjacent panel 12 to create the seal.

In a preferred embodiment, each panel 12 includes a curvature difference from one side of the panel to the other side of the panel. In other words, the left or first side 15 of the panel 12 includes a first curvature (or radius of curvature) and the right or second side 17 of the panel 12 includes a second curvature (or radius of curvature). For example, the curvature difference can be about 5%. This curvature difference helps the panels 12 to seal when the different curvatures are pressed against one another. The portion of the panel 12 in front/on top of the overlapping portion 14 of an adjacent panel 12 has a smaller radius of curvature. This causes the middles of the panels 12 to come into contact first when the panel 12 is being "shut" and causes a small deformation in the panels. This ensures that the seal member 39 is pressing against both panels 12, which leads to a good seal and good insulation properties. However, this is not a limitation on the present invention and in another embodiment, adjacent panels can have the same radius of curvature all the way across. For reference, as described herein, the front 19 of the panels 12 is the concave side adjacent the passengers in an aircraft and the back 31 of the panels 12 is the convex side.

It will be appreciated by those of ordinary skill in the art that two of the benefits of this design are to provide strong acoustic and thermal insulation. Embodiments include a variety of robust seams and interfaces with other panels and faces of the aircraft interior, such as on floor panels, side wall panels, ceiling panels, walls, surface features, overhead bins, etc.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers, measurements or dimensions noted herein are only examples: alternative implementations may employ differing values, measurements, dimensions or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A panel assembly that is configured to be secured to a frame, the panel assembly comprising:
    a panel having a top and a bottom,
    a first bracket assembly that includes a first pivot member and a first bracket, wherein one of the first bracket and first pivot member is secured to the panel and the other of the first bracket and first pivot member is configured to be secured to the frame, wherein the first bracket includes a slot defined therein that includes a throat and a pivot opening, wherein the throat is defined between first and second opposing throat surfaces, wherein the throat is narrower than the pivot opening, wherein the pivot opening defines a central axis and is dimensioned such that the first pivot member can rotate within the pivot opening between a starting position and an installed position, wherein the first pivot member defines a major axis and a minor axis, wherein the major axis extends laterally along a length of the first pivot member and the minor axis extends laterally along a width of the first pivot member, wherein the length is greater than the width, wherein the first pivot member can fit through the throat when the major axis is approximately parallel to at least one of the first and second throat surfaces, wherein the first pivot member cannot fit through the throat when the major axis is not approximately parallel to at least one of the first and second throat surfaces, wherein the first pivot member can enter the pivot opening in a direction perpendicular to the central axis of the pivot opening, wherein the first bracket includes a pivot portion, wherein the slot is defined in the pivot portion, wherein the pivot portion includes a front surface, a back surface and first and second side surfaces, wherein at least one of the first and second throat surfaces defines a non-right angle with at least one of the front surface and the first side surface, and
    a second bracket assembly that includes a second pivot member and a second bracket, wherein one of the second bracket and second pivot member is secured to the panel and the other of the second bracket and second pivot member is configured to be secured to the frame, wherein the second bracket includes a pivot opening defined therein.

2. The panel assembly of claim 1 wherein the first bracket assembly is positioned adjacent the top of the panel and the second bracket assembly is positioned adjacent the bottom of the panel assembly, and wherein the pivot opening in the second bracket is a closed pivot opening.

3. The panel assembly of claim 2 wherein the first bracket includes a flange portion and the pivot portion that meet at an angle, wherein the flange portion is secured to a back surface of the panel.

4. The panel assembly of claim 1 wherein the panel includes a main body portion and an overlapping portion, wherein a thickness of the overlapping portion is less than a thickness of the main body portion.

5. The panel assembly of claim 4 wherein the overlapping portion is positioned on a first side of the panel and extends from the top to the bottom.

6. The panel assembly of claim 5 wherein the panel includes a seal member thereon, and wherein the seal member is positioned on a second side of the panel and on a back surface of the panel.

7. The panel assembly of claim 5 wherein the panel includes the first side, a second side, a front surface and a back surface, wherein the first side includes a first radius of curvature and the second side includes a second radius of curvature, and wherein the second radius of curvature is greater than the first radius of curvature.

8. The panel assembly of claim 1 further comprising a first latch assembly that includes a first latch member and a first latch bracket, wherein one of the first latch bracket and first latch member is secured to the panel and the other of the first latch bracket and first latch member is configured to be secured to the frame.

9. The panel assembly of claim 8 wherein the first latch member includes a catch that is configured to engage a ledge on the first latch bracket.

10. The panel assembly of claim 9 wherein the first latch member is made of a material such that a magnet can unlatch the first latch member from the first latch bracket.

11. The panel assembly of claim 1 wherein the non-right angle is between 1° and 89°.

12. The panel assembly of claim 1 wherein a first distance is defined between the first and second opposing throat surfaces, and wherein the first distance is greater than the width of the first pivot member.

13. A panel assembly that is configured to be secured to a frame, the panel assembly comprising:
- a panel having a top and a bottom,
- a first bracket assembly that includes a first pivot member and a first bracket, wherein one of the first bracket and first pivot member is secured to the panel and the other of the first bracket and first pivot member is configured to be secured to the frame, wherein the first bracket includes a slot defined therein that includes a throat and a pivot opening, wherein the throat is defined between first and second opposing throat surfaces, wherein the throat is narrower than the pivot opening, wherein the pivot opening is dimensioned such that the first pivot member can rotate within the pivot opening between a starting position and an installed position, wherein the first pivot member defines a major axis and a minor axis, wherein the major axis extends laterally along a length of the first pivot member and the minor axis extends laterally along a width of the first pivot member, wherein the length is greater than the width, wherein the first pivot member can fit through the throat when the major axis is approximately parallel to at least one of the first and second throat surfaces, wherein the first pivot member cannot fit through the throat when the major axis is not approximately parallel to at least one of the first and second throat surfaces, wherein the first bracket includes a pivot portion, wherein the slot is defined in the pivot portion, wherein the pivot portion includes a front surface, a back surface and first and second side surfaces, wherein at least one of the first and second throat surfaces defines a non-right angle with at least one of the front surface and the first side surface, and wherein the pivot opening is open from a top, a bottom and a side, wherein the side includes the first and second throat surfaces, and
- a second bracket assembly that includes a second pivot member and a second bracket, wherein one of the second bracket and second pivot member is secured to the panel and the other of the second bracket and second pivot member is configured to be secured to the frame, wherein the second bracket includes a pivot opening defined therein.

* * * * *